Patented Feb. 17, 1931

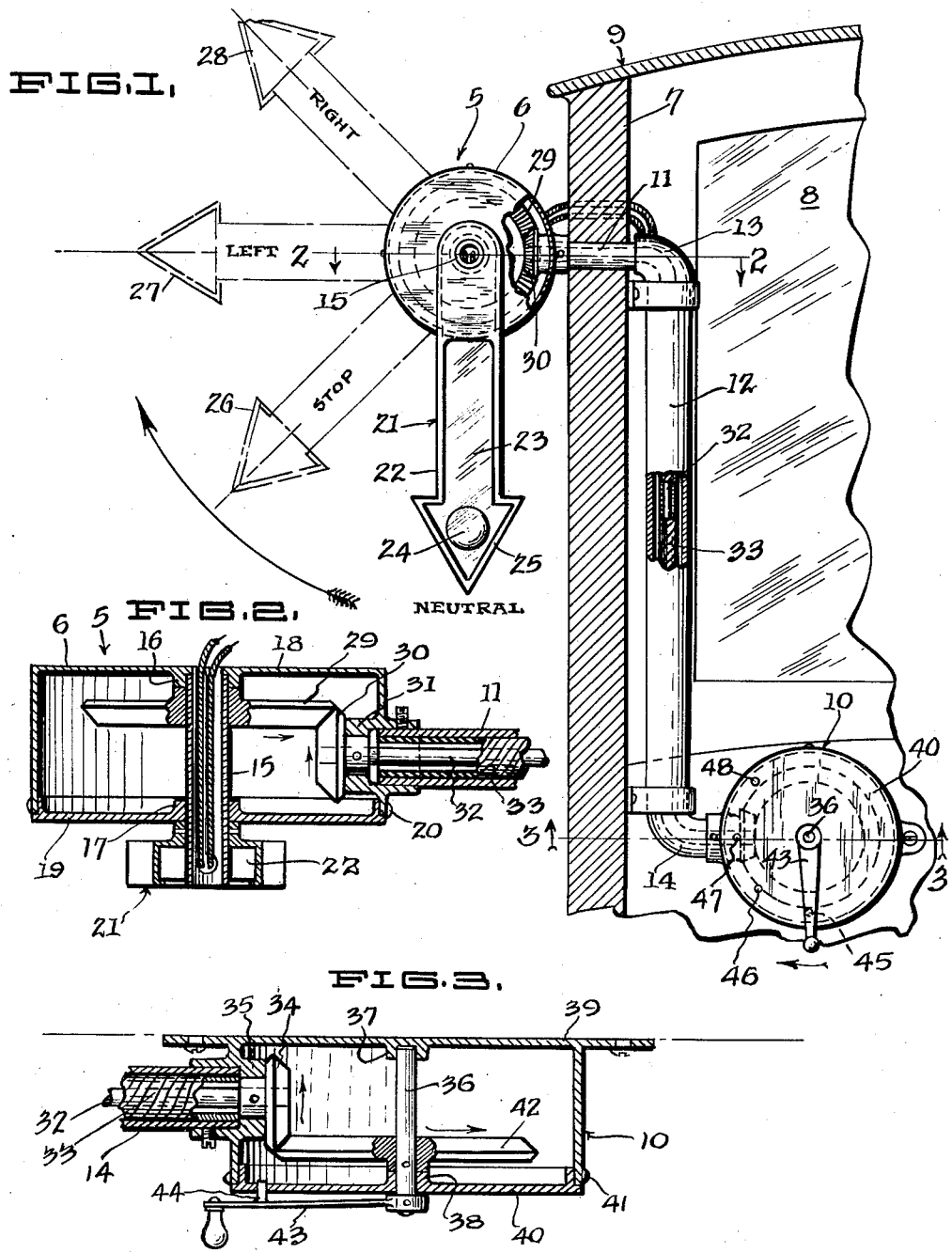

1,793,079

UNITED STATES PATENT OFFICE

ALEXANDER GIANNOPULOS, OF SAN FRANCISCO, CALIFORNIA

DIRECTIONAL SIGNAL FOR AUTOMOTIVE VEHICLES

Application filed January 22, 1930. Serial No. 422,552.

The present invention relates to improvements in signalling devices, and more particularly to those of semaphoric character adapted for use in connection with motor vehicles.

While the usual code, wherein the different signals are indicated through change of position of the hand and arm of the driver, is satisfactorily effected in daylight driving, though at some sacrifice of comfort in inclement weather, this method in night driving is of doubtful utility.

In the present construction, an illuminated semaphore-arm is employed, which, through the manual, or other control, of the driver, is made to assume any of the usual positions of the hand and arm in giving the ordinary signals now universally employed.

The principal object of the present invention is to provide a simple, cheap, and efficient signalling device of the character designated that, under the control of the driver of a vehicle, can be made to indicate any one of the signals now indicated by the different positionings of the hand and arm of the driver as now employed.

A further object of the invention is the provision of a device of the character indicated provided with a single transparent signal member bearing an illuminant and adapted to denote, through selected spaced movements, the usual hand signals from neutral position to "stop," "left turn," and "right turn."

Additional objects and advantages of my invention will appear as this specification progresses, and be still more fully brought out in the claim hereto appended.

In the accompanying drawings, forming a part thereof, and in which like characters of reference denote similar parts, throughout:

Figure 1 is a sectional detail of the corner post of a closed motor vehicle, showing the signal mounted in place and extending outwardly from the vehicle above the foot-board thereof, the signal-arm being mounted for actuation in a plane at right angles to the direction of travel of the vehicle and having its control case mounted within the car body directly in front of the driver, as shown;

Figure 2 is an enlarged horizontal sectional detail of the signal-arm casing, showing the method of mounting the signal-arm and the means for its actuation, the section being indicated by the line 2—2, in Figure 1; and Figure 3 is an enlarged horizontal sectional detail of the signal-control case, showing the operating handle and bevel-gear actuating means, this casing being similar to that of the signal casing, the section being indicated by the line 3—3, in Figure 1.

Referring with greater particularity to the drawings, in which an embodiment of the invention is shown, the numeral 5 designates, in a general way, the signal, which comprises, in detail, a signal casing 6 preferably of circular form and adapted for mounting immediately adjacent the corner post 7 of the vehicle 8 and in a common plane with that of the windshield 9 thereof, a fragmentary portion of said vehicle being shown in Figure 1.

The signal-casing 6 is connected to the casing 10 by means of a nipple 11 and an upstanding pipe 12 having elbows 13 and 14 formed, respectively, on its upper and lower ends. The signal casing 6 is also provided with a tubular shaft 15 carried in suitable bearings 16 and 17, formed, respectively, in the rear end 18 of the casing and in the front cap plate 19, said cap plate being held in place in the casing by means of screws, or the like, 20.

An indicator-arm 21 is mounted on the outer end of the shaft 15 and comprises a hollow member 22 preferably in the form of an arrow and having transparent panels 23 arranged on opposite sides thereof and an illuminant 24 arranged in the head 25 thereof, so that said illuminant is visible from both front and rear of the vehicle.

The indicator-arm, as thus arranged, is adapted to be moved from a neutral, or vertical position, to a 45 degree position 26, a 90 degree position 27, and a 135 degree position 28, these various positions indicating, respectively, neutral position, stop position, left turn position, and right turn position, these signalling positions being those universally adopted and used by motorists throughout the States in indicating the intended directional movements of the driver of the vehicle.

Means for the actuation of the indicator-arm to the various positions described comprise, a bevel gear 29 fixedly mounted upon the shaft 15 and meshing with a pinion 30 carried by a suitable bearing 31 formed in one side of the signal-case 6, said pinion being connected to a suitable flexible shaft 32 mounted in a flexible tubing 33, which tubing is in turn mounted in the pipe 12 of the device.

The lower extremity of the flexible shaft 32 enters the side of the control-case 10 and is fixedly secured to a similar bevel gear 34 mounted in a suitable bearing 35 similar to the bearing 31 in the signal casing. An actuating shaft 36 is mounted in the control-casing and is carried by bearings 37 and 38 formed, respectively, in the rear end 39 of the casing and in the cap member 40 thereof, which cap member is held in place by screws 41.

A bevel-gear 42 is fixedly mounted upon the shaft 36 and meshes with the pinion 34, these gears being of the same diametrical pitch as the gears 29 and 30 and adapted for rotational movement by means of an operating crank 43 arranged on the outer end of the shaft 36, said crank being of flexible spring character and having a stop-pin 44 arranged on its inner side and adapted to engage various openings 45 arranged in the cap 40, these openings being so arranged as to hold the signal-arm in the variously described indicating positions.

The operating crank 43, as indicated in Figure 1, is in neutral position as is the indicator 21 and when said crank is moved to the left one notch, or to the opening 46, the indicator points to the position 26, or "stop position," and so on to the openings 47 and 48, indicating, respectively, the "left" and "right" turn positions.

Of course, any indicating position may be selected by the proper selection of any one of the various openings 45, 46, 47 or 48, the crank being, of course, returned to neutral position each time after a given signal has been indicated to approaching vehicles or pedestrians.

Having thus described my invention, I claim, and desire to secure by Letters Patent of the United States the following:

A signalling device for automobiles comprising a pair of spaced similar casings and a connecting tube, said casings and tube being positioned in substantially the same vertical plane, one of said casings being adapted to be located inside of the automobile adjacent the windshield and the other casing outside of the automobile with the tube extending upwardly from the first named casing to the second named casing and adjacent the corner post of the automobile, duplicate sets of gearing in said casings, an operative connection in said tube between said sets of gearing, a signal arm connected to the gearing in the second named casing, and an operating means connected to the gearing in the first named casing.

In testimony whereof I affix my signature.
ALEXANDER GIANNOPULOS.